United States Patent [19]
Lipskier

[11] Patent Number: 5,841,493
[45] Date of Patent: Nov. 24, 1998

[54] METHOD FOR THE MAKING OF A FILM OF POLYMER-BASED MATERIAL

[75] Inventor: Jean-Francois Lipskier, Verrieres le Buisson, France

[73] Assignee: Thomson—CSF, Paris, France

[21] Appl. No.: 715,498

[22] Filed: Sep. 18, 1996

[30] Foreign Application Priority Data

Sep. 19, 1995 [FR] France .................................. 95 10951

[51] Int. Cl.[6] .............................. G02F 1/1333; G02F 1/13
[52] U.S. Cl. ................................. 349/86; 249/92; 249/89; 249/187; 428/1; 252/299.01
[58] Field of Search ............................. 349/86, 92, 187, 349/89; 428/1; 252/299.01

[56] References Cited

U.S. PATENT DOCUMENTS

| | | | |
|---|---|---|---|
| 5,430,563 | 7/1995 | Bouteiller et al. | 399/88 |
| 5,528,401 | 6/1996 | Narutaki et al. | 349/86 |
| 5,539,547 | 7/1996 | Ishii et al. | 349/86 |
| 5,599,478 | 2/1997 | Matumoto et al. | 349/117 |

FOREIGN PATENT DOCUMENTS

| | | | |
|---|---|---|---|
| 0501409 | 9/1992 | European Pat. Off. | 349/88 |
| 0 619 360 A1 | 10/1994 | European Pat. Off. | |
| 2 525 529 | 10/1983 | France . | |

*Primary Examiner*—William L. Sikes
*Assistant Examiner*—Julie Ngo
*Attorney, Agent, or Firm*—Oblon, Spivak, McClelland, Maier & Neustadt, P.C.

[57] ABSTRACT

Disclosed is a method for the manufacture of film made of polymer based material that is particularly well suited to open-pore type cross-linked polymers. The disclosed method comprises the following steps: the making of a cell C comprising, between a substrate $S_1$ and a substrate $S_2$, a compound comprising a precursor of the polymer P, at least one of the substrates $S_1$ and/or $S_2$ being soluble in a solvent $\Sigma_1$ and/or a solvent $\Sigma_2$, said solvent $\Sigma_1$ and/or said solvent $\Sigma_2$ being a non-solvent for the polymer P; the polymerization of the polymer P within the cell C; the immersion of the cell C in the solvent $\Sigma_1$ and/or the solvent $\Sigma_2$ so as to eliminate the substrate $S_1$ and/or the substrate $S_2$. Applications: liquid crystal devices, molecular sensors.

2 Claims, 1 Drawing Sheet

METHOD FOR THE MAKING OF A FILM OF POLYMER-BASED MATERIAL

BACKGROUND OF THE INVENTION

1. Field of the Invention

The field of the invention is that of polymer-based materials and especially materials comprising open-pore cross-linked polymers, enabling easy access to the interior of the pores.

The present invention relates more specifically to a method that can be used to implement (organic or inorganic) polymer materials in the form of thin films of controlled thickness.

2. Description of the Prior Art

It is generally possible to obtain thin films of polymer materials out of liquid compounds based on pre-polymers and cross-linkage agents, deposited on substrates, by centrifugation or silk-screen printing, using a brush, provided that the viscosity of these compounds is sufficient to prevent them from flowing before the polymerization step that leads to the formation of a solid polymer film.

However, in certain cases, these techniques cannot be envisaged when the compounds available have excessively low viscosity or are compounds leading to the formation of excessively thin polymer films.

In these examples, the liquid compound is conventionally confined in a cell between two substrates $S_1$ and $S_2$. The thickness of the cell may be calibrated by means of shims of controlled thickness. The liquid compound is then polymerized within the cell. The polymerization may be of the thermal or photochemical type if one of the substrates is transparent to the radiation used for the photopolymerization.

This technique can be used to obtain homogeneous films with a well calibrated thickness. Nevertheless, it has the drawback of confining the polymer film between two substrates whereas in certain applications it is necessary to be able to remove one of the two substrates to obtain the free diffusion of the chemical species within the polymer formed.

This is especially the case in electro-optical devices based on polymer film in which liquid crystal molecules are dispersed.

Indeed, it may be particularly valuable to synthesize polymer in the presence of $_\chi Lo$ liquid crystal, and then eliminate the liquid crystal fluid phase also containing polymerization impurities to refill the porous polymer film with clean liquid crystal.

In other applications such as those relating to molecular surface sensors, it is necessary to have a sensitive layer in contact with an external medium charged with entities that are to be detected. Sensors of this kind may be for example surface acoustic wave sensors comprising a photosensitive layer deposited on a piezoelectric substrate provided with sets of interdigitated electrodes capable of creating surface acoustic waves that propagate on the sensitive layer. The sensitive layer may be a film of cross-linked polymer based material with molecular imprints comprising selective porous sites adapted to the capturing of very specific entities.

In these different applications referred to on a non-exhaustive basis, it thus becomes necessary to clear one of the substrates of the cell. However, if no special precautions are taken, the polymer film that adheres to the wall gets torn when it is sought to remove one of the substrates. In order to overcome this drawback, it is possible to use substrates that have been previously treated with surfactants so as to reduce the surface energy. This type of treatment nevertheless affects the properties of the wetting of the substrates by the initial liquid compound and may adversely affect the formation of a high quality homogeneous film.

To resolve the problem of the removal of at least one of the substrates, the present invention proposes a method using one or more sacrificial layers as a substrate, said sacrificial layers being soluble in a solvent that is not a solvent of the polymer film previously formed within a cell comprising an initial compound containing a pre-polymer or precursor of the polymer.

SUMMARY OF THE INVENTION

More specifically, an object of the invention is a method for manufacture of a film based on polymer P said method comprising the following steps:

the making of a cell C comprising, between a substrate $S_1$ and a substrate $S_2$, a compound comprising a precursor of the polymer P, at least one of the substrates $S_1$ and/or $S_2$ being soluble in a solvent $\Sigma_1$ and/or a solvent $\Sigma_2$, said solvent $\Sigma_1$ and/or said solvent $\Sigma_2$ being a non-solvent for the polymer P;

the polymerization of the polymer P within the cell C;

the immersion of the cell C in the solvent $\Sigma_1$ and/or the solvent $\Sigma_2$ so as to eliminate the substrate $S_1$ and/or the substrate $S_2$.

The invention is particularly valuable for cross-linked polymer.

Indeed, in the case of cross-linked polymer which is therefore insoluble to any solvent, the dissolving of one of the substrates does not entail any danger of corrosion of said film of cross-linked polymer.

The polymer may be porous cross-linked polymer enclosing dispersed liquid crystal $_\chi L$ within its pores. In this context, an object of the invention is also a method for the manufacture of a film made of a material based on polymer P, this method comprising the following steps:

the making of a cell C comprising, between a substrate $S_1$ and a substrate $S_2$, a compound comprising a monomer of the polymer P and liquid crystal $_\chi Lo$;

the polymerization of the monomer of the polymer P;

the elimination of one of the two substrates by the placing of the cell C in a solution in the solvent of said substrate;

the elimination of the liquid crystal $_\chi Lo$ in the polymer P by the immersion of the film of polymer P and of the remaining substrate, in a solvent $\Sigma_o$ of the liquid crystal $_\chi Lo$;

the introduction of the liquid crystal $_{\chi L}$ into the film of polymer P.

An object of the invention also is an electro-optical device, the making of which uses a method for the manufacture of a film according to the invention. More specifically, in this context, an object of the invention is an electro-optical device comprising, between a substrate $S_1$ and a substrate $S_3$, a polymer film in which liquid crystal $_\chi L$ is dispersed, wherein:

the substrates $S_1$ and $S_3$ comprise electrical field control electrodes to be applied to the polymer film;

the polymer film is obtained according to the method referred to here above.

The method according to the invention can also be used advantageously to obtain films of macroporous materials with molecular imprints, having cavities whose steric and functional configuration is specifically adapted to the capturing of particular entities G' within the cavities.

And, in particular, an object of the invention is also a method for the manufacture of a film of material based on polymer P, comprising the following steps:

the making of a cell C comprising, between a substrate $S_1$ and a substrate $S_2$, a compound comprising functional monomers that are a precursor of the polymer P and template molecules G forming specific interactions with the monomers;

the polymerization of the functional monomers;

the elimination of one of the two substrates by the placing of the cell C in a solution in the solvent of said substrate;

the elimination of the molecules G by the placing of the film of polymer P and of the remaining substrate in a solution, in a solvent $\Sigma_G$ of the molecules G.

As this type of film made of material with molecular imprints is particular useful in molecular sensors, an object of the invention is also a molecular sensor comprising a film of material with molecular imprints based on macroporous cross-linked polymer deposited on the surface of a substrate $S_1$, wherein:

the substrate $S_1$ is a piezoelectric material comprising, on each side of the film of material with molecular imprints, two series of electrodes $SE_1$ and $SE_2$ so as to induce and recover surface acoustic waves;

the film of material with molecular imprints is obtained according to the method referred to here above.

BRIEF DESCRIPTION OF THE DRAWINGS

The invention will be understood more clearly and other advantages shall appear from the following description, given as a non-exhaustive example, and from the appended figures, of which.

MORE DETAILED DESCRIPTION

Figure 1:
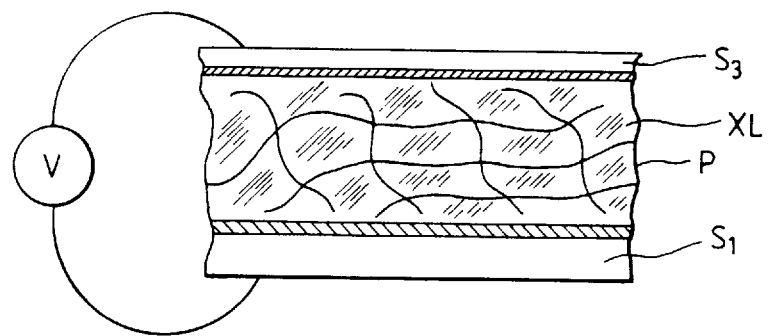
FIG. 1 gives a schematic view of an electro-optical device comprising a polymer film in which there is dispersed liquid crystal, obtained according to a method of manufacture of the invention.

Generally, the method of the invention for the manufacture of a film of polymer-based material comprises the following different steps:

In a first stage, a cell C is made in a conventional way by the deposition, on a first substrate $S_1$, of a liquid compound containing the precursor of the polymer as well as possible polymerization agents or other molecules needed for the applications in view. The second substrate $S_2$ may then be deposited on the surface of the liquid compound covering the first substrate $S_1$.

Depending on the viscosity of the liquid compound, it may, in certain cases, be introduced by capillarity into an empty cell C, prepared beforehand with the two substrates $S_1$ and $S_2$ separated by thickness shims.

In a second stage, the liquid compound enclosed in the cell C is polymerized.

As the case may be, the process may be one of thermal polymerization requiring the heating of the cell C or one of photopolymerization achieved by the irradiation of the cell, one of the substrates being transparent to the radiation used during the polymerization.

In a third stage, with the polymer P being formed, the entire cell C is immersed in a solvent of one of the substrates $S_1$ or $S_2$ that is not a solvent of the polymer P so as to clear a surface of the previously formed polymer film. This operation may be renewed to eliminate the second substrate if this should be necessary.

A more precise description of the invention shall be given in the context of the manufacture of film made of dispersed liquid crystal polymer, used in electro-optical devices. Indeed, liquid crystal polymer type materials have the great value of being able to go from a transparent state to a scattering state as a function of the voltage applied to them.

Generally, devices of this kind are most usually made by polymerizing a liquid compound comprising cross-linked monomers and liquid crystal molecules, between two solid substrates, so as to obtain a composite film having a solid phase consisting of polymer that is insoluble in any solvent and a liquid phase consisting essentially of liquid crystal but also monomers, fragments of polymerization triggers, trapped free radicals or other residual impurities that are soluble in the liquid crystal.

These impurities are generally detrimental to the working of the device in that they reduce the electrical resistance of the material and in that they are likely, in the long run, to cause chemical modifications that induce or accelerate an ageing of the device. Furthermore, the addition of dichroic dyes, which would make it possible to improve the performance characteristics of the devices or widen their field of application, is difficult. For, these dyes are generally highly absorbent in the visible and ultraviolet ranges and therefore have an adverse effect on the efficiency of polymerization when it is carried out by photochemical means. Furthermore, these dyes are easily degraded by the free radicals formed during polymerization. It is therefore especially desirable to be able to "cleanse" the compound obtained, in replacing the fluid phase by a "clean" liquid crystal possibly containing a dichroic dye. It is also possible to take advantage of this operation to chemically modify the surface of the solid phase in order to improve the dynamic properties of the device as described by the Applicant in the patent application published under No. 2 703 690.

A first technique consists in "washing" the compound by means of a solvent of the liquid crystal. The solvent is then evaporated, leaving a porous film of insoluble polymer. The new liquid crystal based compound, which possibly includes a dichroic dye, is then introduced by diffusion into the film of porous polymer. It is nevertheless preferable to eliminate the solvent from the liquid crystal by drying in a supercritical phase and not by simple evaporation so as not to deteriorate the film of porous polymer under the effect of the forces of capillarity exerted on the liquid-vapor interface as explained by the present Applicant in the French patent application No. 94 07572.

In these different methods, it is necessary to bring about a circulation of the fluids (solvent in liquid, gaseous or supercritical phase, liquid crystal, reagents, etc.). It is therefore highly advantageous to be able to expose the surface of the material, especially when large-sized devices have to be made.

In an exemplary film that can be used in these electro-optical devices, the following homogeneous mixture can be used as a starting liquid compound:

Monomer PN 350 (Merck BDM) containing 2.5% of Darocure 1173 photo-trigger;

Liquid crystal TL 202 (Merck).

This mixture is introduced by capillarity between the two substrates $S_1$ and $S_2$ separated by thickness shims. The substrate $S_1$ may be transparent or reflective depending on the applications in view and provided with control electrodes. The substrate $S_2$ is preferably relatively thin and formed by a material that is insoluble in the starting liquid compound but soluble in a solvent $\Sigma_2$.

The cell thus formed is then immersed in a large quantity of solvent $\Sigma_2$ so as to dissolve the substrate $S_2$. The solvent $\Sigma_2$ may advantageously be ether ethyl which has the property of not particularly disturbing the solid phase of the compound (there is no swelling or breakage of the walls of the pores), should the substrate $S_2$ be of the poly-(ethylmethacrylate) or poly-(n(propylmethacrylate) film type. A substrate $S_2$ of this kind has the advantage of being transparent, thus enabling polymerization by photochemical means.

According to the invention, the step of dissolving the substrate $S_2$ is followed by a step for the elimination of the fluid phase comprising the initial liquid crystal $_\chi Lo$ in order to purify the polymer matrix to fill it again with pure liquid crystal $_\chi L$. This elimination is obtained by immersing the polymer film in which the liquid crystal $_\chi Lo$ is dispersed in a solvent $\Sigma_o$.

The solvent $\Sigma_2$ may be chosen in such a way that it can also be a solvent of the liquid crystal $_\chi Lo$.

This is especially the case with ethyl ether which is capable of dissolving the liquid crystal TL 202.

In this case, the steps for the dissolving of the substrate $S_2$ and for eliminating liquid crystal $_\chi Lo$ are merged into one and the same step.

Generally, after these steps, the porous film of polymer also has non-negligible quantities of solvent $\Sigma_2$ trapped within pores of the cross-linked polymer. This is why it is advantageously possible to extract the remaining solvent in the presence of a $CO_2$ type gas in a supercritical phase as explained by the present Applicant in the French patent application No. 94 07572. The porous polymer network thus obtained may then be functionalized if necessary by bringing about the diffusion of reagents in gaseous phase (acyl chlorides for example). It can then be filled with a new compound of liquid crystals $_\chi L$ which in particular may contain a dichroic dye.

In the context of the making of an electro-optical device as shown schematically in FIG. 1, the composite film thus obtained may then be covered with a transparent substrate $S_3$ having a conductive surface forming the second control electrode so as to enable the application of the control electrical fields needed for the operation of the electro-optical device thus formed.

The invention shall also be described in the context of the making of a film made of materials with molecular imprints that is especially valuable for the designing of highly specific chemical sensors.

The materials are constituted by highly cross-linked polymer. They have high porosity. The pores are extremely selective capturing sites adapted to the highly selective detection of molecules.

To make films of polymers of this kind, the typical procedure used is the following:

a molecule G is placed in a state of equilibrium in a solution with functional monomers. This molecule G has a chemical structure that is identical or very close to that of the molecules G' that can be detected by sensors of this kind, the functional monomers being chosen in such a way that, with the molecules G as well as with the molecules G', they form specific interactions leading to reversible bonds.

The compound described here above is deposited on the surface of a substrate $S_1$ and then covered with a substrate $S_2$ so as to form the cell C.

The functionalized monomers are then photopolymerized through one of the substrates chosen to be transparent.

After the immersion of the cell in a solvent $\Sigma_2$, leading to the elimination of the substrate $S_2$, the molecules G extracted by an appropriate solvent $\Sigma_G$, leaving a porous cross-linked material comprising a large number of cavities having a shape and a distribution of functional groupings that are perfectly suited to the complexation of G' entities.

Figure 2:
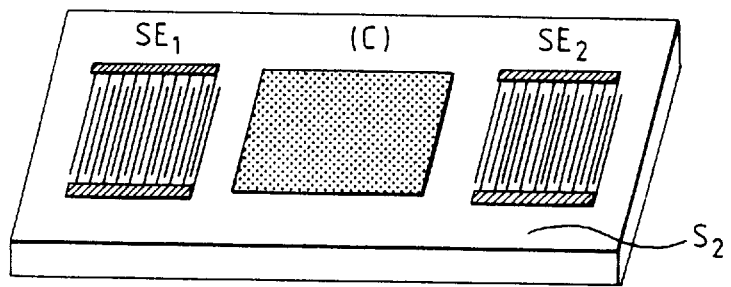
FIG. 2 gives a schematic view of a molecular sensor in which the sensitive layer is a film of macroporous polymer obtained according to a method of the invention.

In the context of the making of surface acoustic wave sensors, it is possible to use a substrate of the piezoelectric material type on which there are previously deposited sets of electrodes enabling the creation of surface acoustical waves, the sensitive layer formed by a film of macroporous cross-linked polymer being located between two series of electrodes $SE_1$ and $SE_2$ as shown in FIG. 2.

For this purpose, the substrate $S_1$ may be larger-sized than the substrate $S_2$.

At the center of the substrate $S_1$, the polymerizable compound is then placed between two sets of interdigitated electrodes. Then, on this sensitive layer, the substrate $S_2$ is placed. This substrate $S_2$ makes it possible to flatten and obtain a uniform layer formed by the desired compound.

According to a step of the method of the invention, the entire unit is then subjected to the photopolymerization of the initial compound and then to the immersion of the previously-formed cell to eliminate the substrate $S_2$.

In order to promote the adhesion of the layer of material with molecular imprints, the piezoelectric substrate $S_1$ may advantageously be functionalized by the immersion of said substrate especially in a solution enclosing silane type compounds well suited to the type of monomers used in materials with molecular imprints.

For example, a quartz-type piezoelectric substrate $S_2$ may be functionalized by immersion in a solution of 3-acryloxypropyltrimethoxysilane in a proportion of 2% in a mixture of water, ethanol and acetic acid with a pH factor of 5. The substrate $S_2$ is then washed abundantly with ethanol and then washed with chloroform and then dried.

The compound containing the monomers and the molecules G used as a template is then deposited on said treated substrate.

In this case, the monomers may advantageously be functional monomers comprising at least one fragment capable of entering into a reaction of polymerization or polycondensation and at least one fragment capable of setting up a hydrogenous bond, an ionic bond, a co-ordination bond, a covalent reversible bond or any other type of reversible bond having sufficient energy with the template molecule G. Examples of such functional monomers are acrylic acid, methacrylic acid, itaconic acid, acrylamido-2-methyl 2 propane sulfonic-1 acid, N-vinyl pyrrolidone, hydroxy-2 ethyl acrylate or hydroxy-2 propyl acrylate, aza-1 hydroxymethyl-5 dioxabicyclo-3,7 (3, 3.0) octane acrylate, vinyl pyrridines, vinylacetic acid, vinyl-4 phenyl boron acid.

The molecule G used as a template may typically be an ion, an organic molecule of biological or synthetic origin, a polypeptide, a polynucleotide, a polysaccharide or any other chemical species that it may be useful to detect in a selective manner.

For example, a liquid compound consisting of 1 mmol of L-p-aminophenylolanine anilide, 4 mmol of methacrylic acid, 19 mmol of ethylene glycol dimethacrylate and 2% of photochemical trigger (Darocure 1173 Merck type) in 5.5 ml of acetonitrile is deposited at the center of the substrate $S_1$.

The substrate $S_2$ is then deposited thereon. This substrate $S_2$ consists for example of a film of PVA (polyvinylalcohol). The cell thus formed may be illuminated by ultraviolet radiation (365 nm) from a Dr Monle 400 F type lamp. When the polymerization is completed, the PVA film forming the substrate $S_2$ may be dissolved in water and then the extraction of L-p-aminophenylalanine anilide may be done by successive washing with ethanol. The substrate $S_2$ used may be also a PET film that can be dissolve in nitrobenzene.

What is claimed is:

1. A method for the manufacture of a device comprising a film based on polymer P, comprising the following steps:

forming a cell C comprising between a substrate $S_1$ and a substrate $S_2$, a compound comprising a precursor of the polymer P; wherein at least one of the substrates $S_1$ or $S_2$ is such that $S_1$ is soluble in solvent $\Sigma_1$ or $S_2$ is soluble in a solvent $\Sigma_2$; and wherein said polymer P is not soluble in either said solvent $\Sigma_1$, or said solvent $\Sigma_2$;

polymerizing said polymer P within the cell C;

immersing said cell C in at least one of $\Sigma_1$ or $\Sigma_2$ so as to eliminate the substrate $S_1$ and/or the substrate $S_2$;

wherein said polymer P is an open-core cross-linked, macroporous material with molecular imprints having cavities whose steric and functional configuration is specifically adapted to the capturing of particular entities G' within the cavities.

2. A molecular sensor, comprising:

(1) a substrate $S_1$; wherein said substrate $S_1$ is a piezoelectric material;

(2) a sensitive layer formed on one side of said substrate $S_1$ and comprising two series of electrodes $SE_1$ and $SE_2$, each of which is on said one side of $S_1$ spaced from each other; and a macroporous open-pore, cross-linked polymer with molecular imprints having cavities whose steric and functional configuration is specifically adapted to the capturing of particular entities G' within the cavities, formed between said two series of electrodes; and (3) a substrate $S_2$ placed on said sensitive layer;

wherein said sensitive layer is formed by a method comprising the following steps:

placing a compound comprising a precursor of a polymer P between said two series of electrodes;

polymerizing said compound comprising the precursor of polymer P to form said macroporous, open-pore, cross-linked polymer.

\* \* \* \* \*